DIGITALLY TEMPERATURE COMPENSATED OSCILLATOR

Filed Sept. 1, 1971

DIGITALLY TEMPERATURE COMPENSATED OSCILLATOR

FREQUENCY VARIATION Vs TEMPERATURE

1

3,713,033

DIGITALLY TEMPERATURE COMPENSATED OSCILLATOR

Marvin E. Frerking, Cedar Rapids, Iowa, assignor to Collins Radio Company, Dallas, Tex.

Filed Sept. 1, 1971, Ser. No. 176,888
Int. Cl. H03b 5/36
U.S. Cl. 331—116 R 11 Claims

ABSTRACT OF THE DISCLOSURE

A system for digitally correcting the frequency of a crystal oscillator as a function of ambient temperature. Ambient temperature sensed is converted to digital data that is used to address a preprogrammed read only memory to determine the frequency correction factor required for the ambient temperature measured. The factor in the form of a digital frequency correction word is then converted to an analogue voltage and applied to a voltage responsive oscillator frequency varying device for correcting oscillator frequency.

Figure 1:
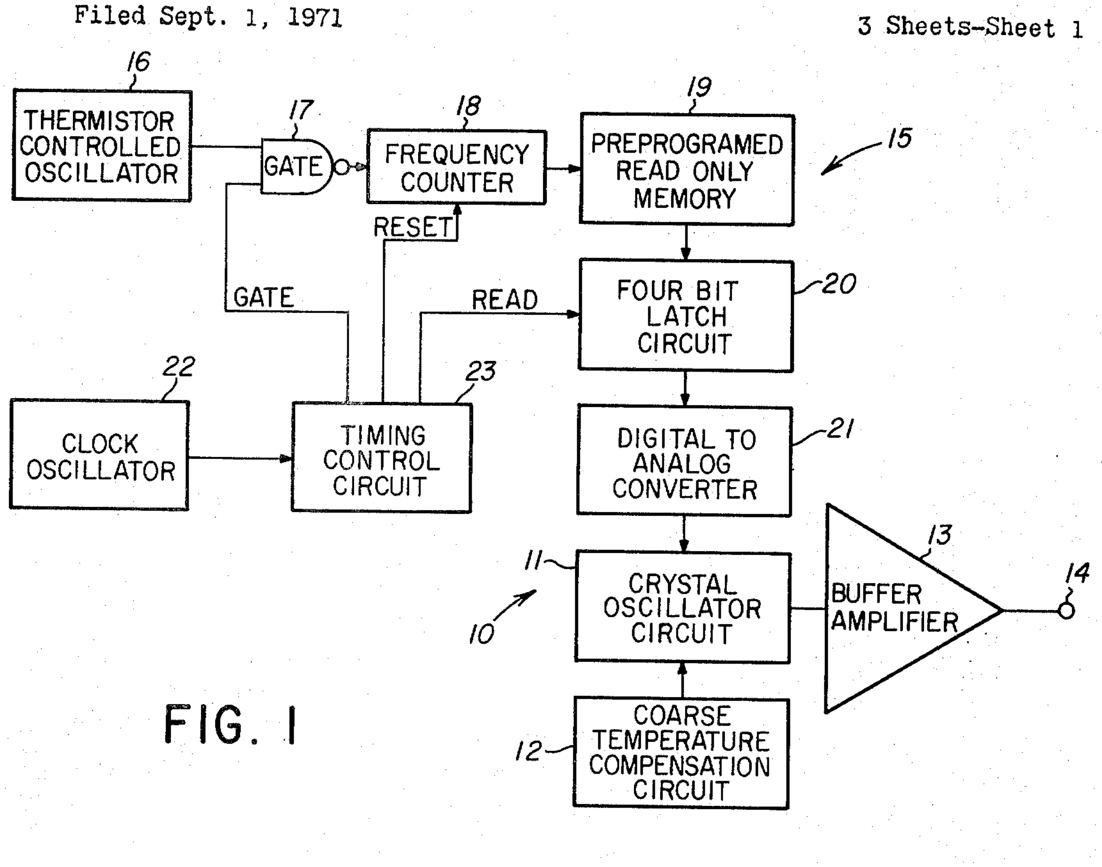

This invention relates in general to temperature compensated crystal oscillators and, in particular, to high stability digitally temperature compensated crystal oscillators.

The frequency stability of a temperature compensated crystal oscillator can be no better than the degree to which the compensation network matches the temperature coefficient of the crystal. This matching becomes particularly difficult for accuracies in the region better than 1 pp. $10^7$ for several reasons. If a continuous compensation network is used, the number of resistors and thermistors required to generate a properly shaped curve becomes large. The resulting interaction of selectable resistors makes compensation a formidable task even with the aid of a computer. It has been found possible, however, to approach $\pm 5$ pp. $10^8$ stability using this single method with compensation limited to the $-40$ to $+80°$ C. region. A particular temperature compensated crystal oscillator was compensated using a network composed of five thermistors and a complement of resistors with a computer program used to select the resistor values. Actually, due to minute irregularities in the required voltage function, it is difficult for a computer to find resistance values fitting the curve exactly, and once satisfactory resistance values are determined, actual resistors must be selected to an accuracy of better than 0.1 percent. Another factor is that the temperature coefficient of selected resistors alone may result in errors of about 5 pp. $10^8$. While a segmented compensation network is sometimes used in place of a continuous type to yield some relief in shaping the curve, other error factors still remain. Another problem is that of warmup drift with the proximity of a heat source to the crystal or thermistors creating a temperature gradient between the crystal and the compensation network with a resulting warmup drift. These problems contribute to difficulty in synthesizing a network of adequate fit, complexity of the circuit when expanded for proper fit, and difficulty in achieveing a predicted performance.

It is, therefore, a principal object of this invention to achieve fine temperature compensation of crystal oscillators to a high degree of accuracy.

Another object is to achieve such fine temperature compensation of crystal oscillators via an ambient temperature digital data addressed preprogrammed read only memory for temperature frequency compensation.

A further object is to provide such digital correction of the frequency of an oscillator as a function of temperature in a highly reliable crystal oscillator circuit with a minimum of discrete components.

2

Another object is to advantageously combine both coarse compensation and fine digital temperature compensation in a temperature compensated crystal oscillator.

Features of the invention useful in accomplishing the above objects include, in a digitally temperature compensated crystal oscillator, ambient temperature sensed conversion to digital data circuitry and a preprogrammed read only memory to determine the frequency correction factor required for the ambient temperature measured. This resulting factor in the form of a digital frequency correction word is then converted to an analogue voltage and applied to a voltage responsive oscillator frequency varying device for correcting oscillator frequency. It is a system particularly useful to fine temperature compensate the frequency of an oscillator that has been coarse compensated in a conventional manner with resistors and thermistors.

A specific embodiment representing what is presently regarded as the best mode of carrying out the invention is illustrated in the accompanying drawings.

Figure 3:
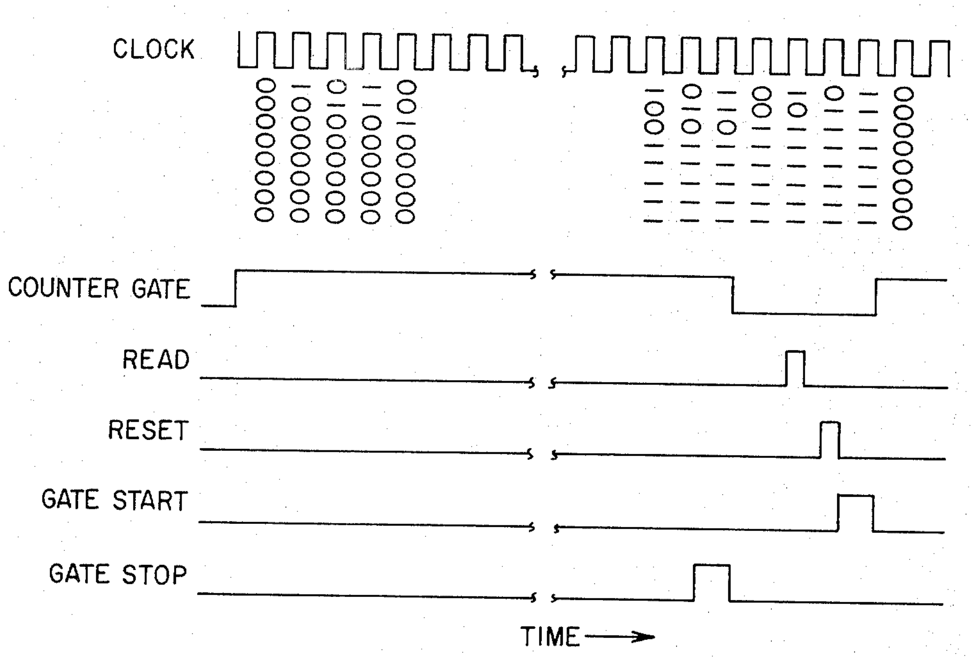
Figure 2:
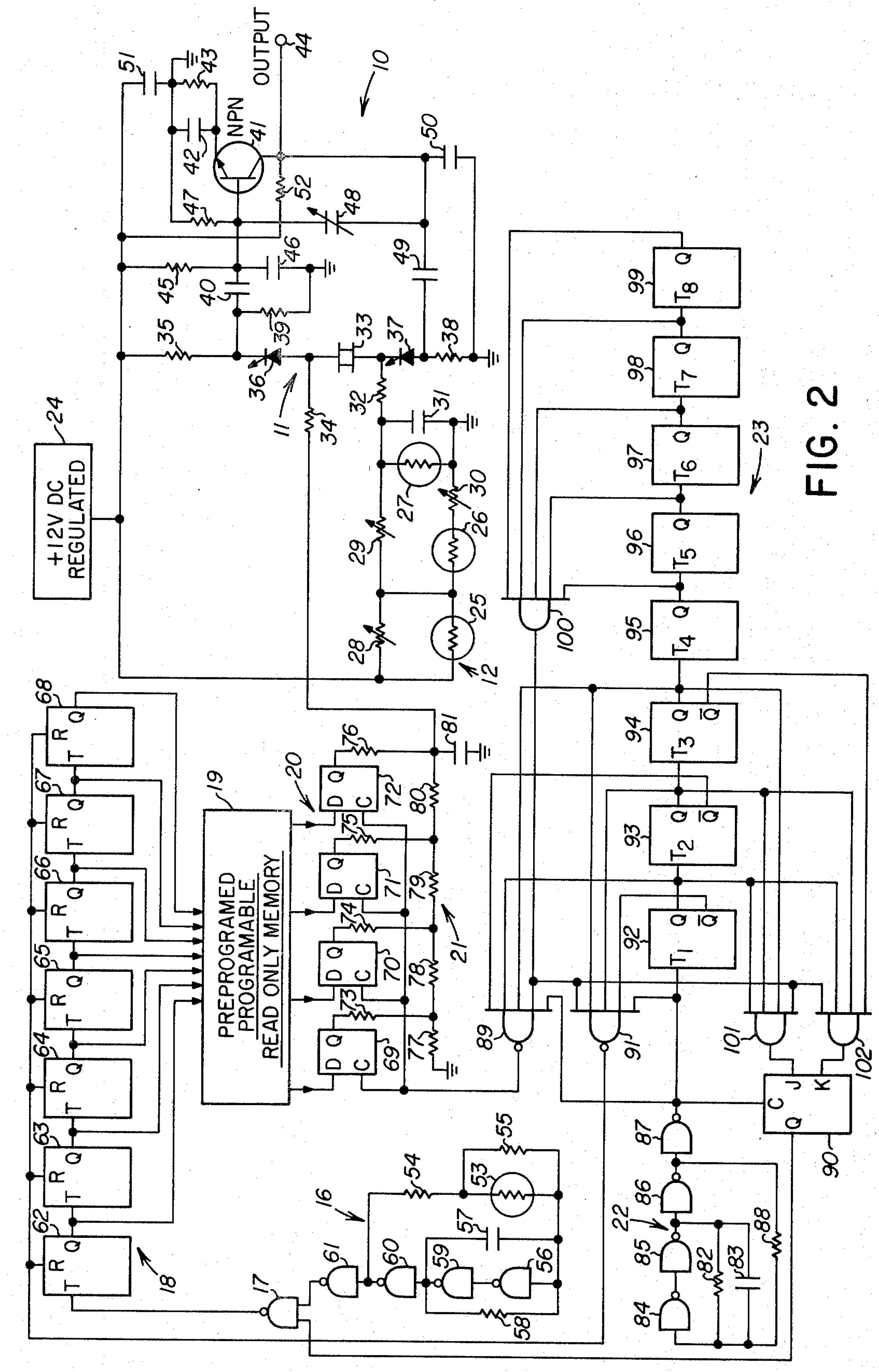
Figure 4:
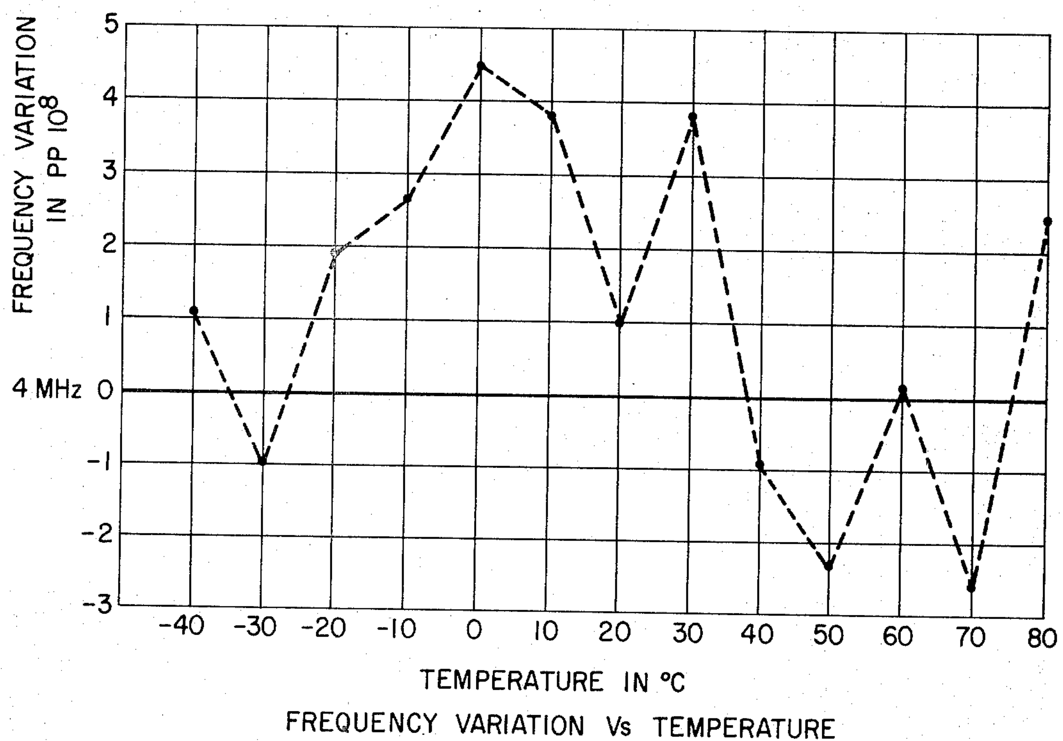
Figure 5:
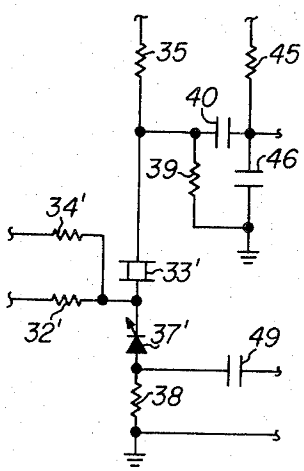
Figure 6:
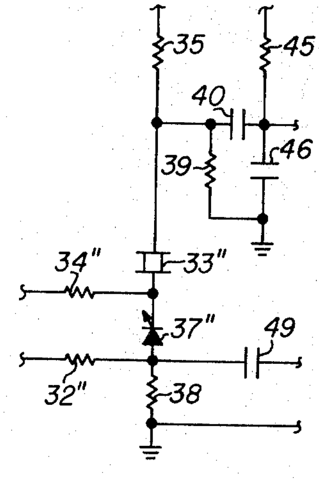

In the drawings:

FIG. 1 represents a block diagram of a digitally temperature compensated crystal oscillator in accord with applicant's teachings;

FIG. 2, a more detailed combination block-schematic of a digitally temperature compensated crystal oscillator;

FIG. 3 a timing control waveform family for the digitally temperature compensated crystal oscillator of FIG. 2;

FIG. 4, a frequency variation vs. temperature curve for a 4 MHz digitally corrected temperature compensated crystal oscillator such as shown in FIG. 2; and FIGS. 5 and 6, partial schematics of different circuit embodiments for applying coarse and fine digital temperature variation compensation in temperature compensated crystal oscillators.

Referring to the drawings:

The temperature compensated crystal oscillator 10 of FIG. 1 includes a crystal oscillator circuit 11 having a coarse temperature compensation input correction signal from coarse temperature compensation circuit 12 and also has a fine temperature compensation signal input in providing a corrected frequency output applied through buffer amplifier 13 to signal output terminal 14. The fine temperature compensation signal input to the crystal oscillator circuit 11 is derived from a digitally temperature compensating fine correction circuit 15 including a thermistor controlled oscillator 16. The oscillator 16 circuit is frequency variable as a function of temperature sensed by the thermistor in the thermistor controlled oscillator circuit in developing a variable frequency output applied as an input to NAND gate 17. Discrete numerical signal cycles are subject to being gated therethrough to frequency counter circuit 18 that repeatedly applies count totals as addressed inputs to preprogrammed read only memory circuit 19. The resultant output from the preprogrammed read only memory is applied to a four-bit latch circuit 20 whenever the four-bit latch circuit 20 is activated for reading the preprogrammed read only memory. Each resulting output of the four-bit latch circuit is applied to a digital-to-analog converter 21 in developing a DC output that acts as a fine tune input to the crystal oscillator circuit 11. Clock oscillator 22, that may be an independent clock frequency source or a frequency timing portion of the crystal oscillator circuit 11 itself as an alternate clock, provides a timing clock input signal to timing control circuit 23. The timing control circuit 23 provides an output gate signal input to gate 17, in addition to the frequency signal input from thermistor controlled oscillator circuit 16, periodic reset signals through a reset line connection to frequency counter circuit 18, and a read signal through a read signal line from the timing control circuit 23 to four-bit latch circuit 20.

Referring also to the more detailed combination box-schematic showing of a digitally temperature compensated crystal oscillator circuit 10, in conjunction with the timing control waveform family of FIG. 3, the coarse temperature compensation circuit 12 is shown as a continuous thermistor network, such as utilized for generating third-order voltage-temperature characteristics. The network circuit 12 is connected to positive 12 volt DC regulated voltage supply 24 and includes thermistors 25, 26 and 27, adjustable resistors 28, 29, and 30 and capacitor 31 and is connected through resistor 32 to the crystal oscillator circuit 11. It is of interest to note that the coarse temperature compensation circuit 12 could actually be in the form of a segmented network as may be desired in place of the continuous thermistor network shown. In any event, the coarse temperature compensation circuit 12 connection is through resistor 32 to one side of crystal 33, and the fine temperature compensating correction circuit 15 is connected through resistor 34 to the other side of the crystal 33 in the crystal oscillator circuit 11. The crystal oscillator circuit 11 includes a connection from the positive 12 volt DC regulated supply 24 successively through resistor 35, Varactor diode 36, the crystal 33, Varactor diode 37, and resistor 38 to ground with the Varactor diodes actually voltage variable capacitors (also having the trade name Varicap). This is with the cathode of Varactor diode 36 connected to resistor 35 and anode to crystal 33 and the cathode of Varactor diode 37 connected to the other side of crystal 33 and anode connected to resistor 38. The junction of resistor 35 and Varactor diode 36 is connected through resistor 39 to ground and through signal frequency coupling capacitor 40 to the base of NPN transistor 41. The transistor 41 has an emitter connection through capacitor 42 and resistor 43 in parallel to ground, and a collector output connection to output terminal 44 that may be connected to and through a buffer amplifier for providing an output as may be desired. The junction of capacitor 40 and the base of NPN transistor 41 is connected through resistor 45 to the 12 volt DC voltage supply 24 and through capacitor 46 to ground. This junction is also connected through resistor 47 to ground and through variable capacitor 48 to the signal output terminal 44 and the common junction of capacitors 49 and 50, serially connected between the anode of Varactor diode 37 and ground. The positive 12 volt DC regulated voltage supply 24 is also connected through capacitor 51 to ground and through resistor 52 to the junction of the collector of NPN transistors 41, the output terminal 44, and capacitors 48, 49, and 50.

The thermistor control oscillator 16 shown in FIG. 2 is a thermistor 53 controlled RC oscillator circuit of a conventional nature including resistors 54, 55, and 56, capacitor 57, and NAND gates 58, 59, 60, and 61, all interconnected as shown and having an output connection as an input to NAND gate 17. NAND gate 17 also receives an additional input from the timing control circuit 23 and has an output connection as an input to frequency wave counter circuit 18. It is of interest to note that a temperature-to-voltage transducer in combination with an analog-to-digital converter circuit could be used in place of the thermistor controlled oscillator circuit 16 shown if desired.

The particular frequency counter circuit 18 used is a 7-bit frequency counter utilizing 7 flip-flops 62, 63, 64, 65, 66, 67, and 68 each having a standard trigger T and reset R input terminals and Q output terminals with the flip-flops successively interconnected Q terminal to successive flip-flop trigger T terminal through the flip-flop circuits 62–68 in a conventional manner. The R reset terminals in some embodiments could be signal invert inputs with ground being the reset input. The Q outputs of the flip-flops 62–68 are connected as the seven signal input connections to pre-programmed programmable read only memory circuit 19. The read only memory 19 that plays an important role is, in this particular instance, a 512 bit programmable read only memory (ROM) available in a 0.270 inch by 0.390 inch 24-lead flatpack from Monolithic Memories Incorporated. The ROM contains 512 fusible memory elements that can be either manually or automatically set to 0 or 1 with this being accomplished by applying a current ramp to the element in question at any one time to obtain a logic 1. Once programmed with this particular ROM the memory is permanent. The thermistor controlled RC oscillator 16, as a temperature sensor, feeds an output when gated to do so into the 7-bit frequency counter 18 that by counting frequency pulses or waves for a specific predetermined time interval as controlled by timing control circuit 23 provides digital temperature information. At any given temperature then the ROM can be addressed for the required frequency correction word. This is provided via four output leads from the read only memory connected respectively to the digital D signal input terminals of flip-flops 69, 70, 71, and 72 when they are activated for sensing the output of the read only memory by read signal from the timing control circuit 23. The read signal is applied to the C terminals of flip-flops 69, 70, 71, and 72 for attaining periodically fixed 4-bit words out of the 4-bit latch circuit 20 from the Q outputs of the flip-flops 69, 70, 71, and 72 through resistors 73, 74, 75, and 76, respectively, in driving the resistor ladder type digital-to-analog converter circuit 21. Circuit 21 also includes resistor 77 connected to ground and resistors 78, 79, and 80 serially connected to a junction of resistor 80 with resistors 76 and 34 and capacitor 81 with a plate connected to ground. Resistor 73 is connected to the junction of resistors 77 and 78, resistor 74 to the junction of resistors 78 and 79, and resistor 75 to the junction of resistors 79 and 80, and with equal value resistors 73–77 substantially twice individually the value of equal value resistors 78, 79, and 80. The output of this digital-to-analog converter circuit 21 from the junction of resistors 76 and 80 and capacitor 81 is applied through resistor 34 as a compensation voltage applied to the fine compensation Varactor diode 36. The ROM may be addressed, as is the case with at least one working embodiment, every 20 milliseconds to determine whether the temperature has changed and whether a new frequency correction word is required.

The clock oscillator circuit 22, as shown in FIG. 2 and used in some working embodiments, is a 100 kHz. RC oscillator with parallel connected resistor 82 and capacitor 83 interconnecting the input of NAND gate 84 and the output of NAND gate 85. The clock oscillator circuit 22 also includes two further serially connected NAND gates 86 and 87 with the junction of NAND gates 86 and 87 connected back through resistor 88 also to the input of NAND gate 84. The output connection of NAND gate 87 is the output of the clock oscillator circuit 22 and as such is connected as the clock signal input to timing control circuit 23. In appropriate circumstances the crystal oscillator circuit 11 itself could be used as the clock signal source for the timing control circuit 23, if so desired.

The clock signal input as a clock signal input to timing control circuit 23 is connected as an input to NAND gate 89 that gates periodic read signals to the C input terminals of the 4-bit latch circuit 20 that remains latched to each respective 4-bit word through until each successive read interrogation activates relatch at which instance it may adjust to accord with the particular simultaneous momentary condition of the 4-lead output of the read only memory at the read instant of time. The clock signal input from clock oscillator 22 is also applied as a C terminal input to output control timing control flip-flop 90 of the timing control circuit 23 in developing a counter gate Q signal output therefrom applied as a gating input to the thermistor controlled oscillator signal controlling NAND gate 17. The Q counter gate output of flip-flop 90 is controlled by the J and K inputs thereto as delayed with a clock cycle through the flip-flop circuit 90. The clock signal of clock oscillator 22 is applied as an input to NAND gate 91, the output of which is applied to the reset terminals of the frequency counter circuit 18, flip-flops 62 through 68, and also to the $T_1$ input terminal of the first flip-flop 92 of flip-flops 92 through 99.

The timing control circuit 23 includes the flip-flops 92 through 99 circuit connected in standard frequency time counting fashion with the Q output of flip-flop 92 connected to the $T_2$ input of flip-flop 93 and successively the Q outputs connected to the next T input of the successively following flip-flops through the chain. The Q outputs of flip-flops 95 through 99 are connected as individual inputs to AND gate 100 that has an output connection as an input not only to NAND gates 89 and 91 but also to AND gates 101 and 102 with output connections, respectively, to the J and K input terminals of flip-flop 90. The Q output of flip-flop 92 is also connected as an input to NAND gate 89 and also as an input to AND gates 101 and 102. The Q output of flip-flop 93 is also connected as an input to NAND gate 91 and also as an input to AND gates 101 and 102. The Q output of flip-flop 94 is also connected as an input to NAND gates 89 and 91 and also as an input to AND gate 101. The $\overline{Q}$ output of flip-flop 92 is connected as an input to NAND gate 91. The $\overline{Q}$ output of flip-flop 93 is connected as an input to NAND gate 89, and the $\overline{Q}$ output of flip-flop 94 is connected as an input to AND gate 102. This timinv sontrol rircuit with the 100 kHz. clock signal input from clock circuit 22 gives timing control as set forth in FIG. 3 with clock signal counts as indicated and with various gating functions consistent with the waveforms shown. NAND gate 17 is activated for gating the frequency signal from the thermistor control oscillator 16 as shown for the counter gate waveform. After each counter gate period is over a read interrogation pulse as shown in the read waveform from NAND gate 89 is applied to the C terminals of 4-bit latch circuit 20 after which, time wise while the counter gate is still off, a reset signal from NAND gate 91 is applied to the flip-flops 62 through 68 in the frequency counter circuit 18. Then a gate start signal output from AND gate 101 is applied at the J terminal of flip-flop 90 that results with one clock cycle timing in the flip-flop initiation of the next counter gate Q output from flip-flop 90 applied to gate 17. The output of AND gate 102 is a gate stop signal applied to the K terminal of flip-flop 90 that activates with one clock cycle delay in the flip-flop the counter gate Q signal cut-off ending the each individual counter gate pulse. Obviously other timing control sequences may be employed with various timing control circuit connections designed therefor. One other timing sequence was to energize counter and the temperature sense oscillator, reset the counter to 0, and gate the oscillator to the counter for 2.5 milliseconds, and then energize the ROM during which period there is a read interrogation pulse for reading the new frequency correction word.

It is of interest to note that with the advent of MOS integrated circuits and programmable read only memories, it is possible to build such purely digital fine correction circuits as set forth herewith in a space of, for example, from 1 to 2 cubic inches, and that may be made to operate at an average power level of less than 80 milliwatts. A specific method described provides for 128 completely independent correction points of 16 levels each. In using this technique, the crystal oscillator is first compensated to $\pm 3$ pp. $10^7$ using a coarse compensation network such as has been described. Each of the 16 correction levels then represents slightly less than 4 pp. $10^8$, and the frequency can be adjusted to within 2 pp. $10^8$ at each of 128 evenly spaced correction points throughout the temperature range that may be, for example, a range of from $-40°$ C. to $+80°$ C. It should be noted, however, that such accuracy as being to within 2 pp. $10^8$ is of limited duration since aging of a crystal and/or hysteresis factors inherent in the physics of crystals alter with time. the temperature compensation adjustments are such that if extreme degrees of temperature compensation accuracy are required the read only memory must be periodically reprogrammed in accord with the requirements imposed. By way of reiteration, a thermistor controlled RC oscillator is used as a temperature sensor. The output of this oscillator is fed into a 7-bit frequency counter that, by counting the frequency, provides digital temperature information. At any given temperature then, the ROM can be addressed for the required frequency correction word with this 4-bit word then being read into a low power 4-bit memory, or latch circuit, that in turn drives a multiresistor ladder type digital-to-analog converter circuit. The output of the digital analog converter feeds a fine compensation voltage variable capacitor in the crystal circuit with the ROM being addressed, for example, every 2.56 milliseconds or other time interval as may be required to determine whether the temperature has changed and whether a new frequency correction word is required. Information sensing and preprogramming of the ROM may be obtained in several ways. It is significant, however, that only digital information is required. With, for example, for manual compensation for a temperature compensated crystal oscilaltor after coarse compensation, or coexistent with coarse compensation, the oscillator circuit is run through the temperature range without the ROM. At a convenient number of temperatures (every 10° for example), the digital word in the counter is recorded, and four toggle switches, used in place of the ROM, are set so the frequency is within 2 pp. $10^8$. A chart may then be made with the toggle switch settings corresponding to the temperature words. The ROM is then programmed in accordance with the chart and placed in the temperature compensated crystal oscillator to complete the compensation. With the ROM requiring 128 temperature points the points between actual data points are programmed by interpolation. Actually, as many temperature points as required up to 128 with the system described, or more with a more expensive ROM, could be taken particularly if the system were automated. Further, with a programmable ROM that requires a considerable amount of power it is possible to employ energization of the ROM only during the interval when a frequency correction word is being read such as by energization for 20 microseconds during a 20 millisecond cycle time. Still further, if it is desired to further conserve power, the frequency counter and thermistor control oscillator may be energized for example for only 2.56 milliseconds during each cycle time.

The curve of FIG. 4 illustrates frequency variation vs. temperature through a temperature range of $-40°$ C. to $+80°$ C. with frequency variation generally held to within $\pm 4$ pp. $10^8$ about an oscillator center frequency of 4 MHz. in a temperature compensated crystal oscillator circuit utilizing the fine digitally temperature compensated techniques and methods set forth herein.

Referring now to the digitally temperature compensated crystal oscillator circuit embodiment variation of FIG. 5, components numbered the same as with the embodiment of FIG. 2 are in all probability the same as those components carrying prime numbers may have value variation from their corresponding components in the embodiment of FIG. 2 and portions not shown would be in all probability the same as with the corresponding circuit sections of the FIG. 2 embodiment. In any event, the coarse temperature compensating circuit signal voltage and the digitally temperature compensating fine correction circuit 15 signal voltages are applied through resistors 32′ and 34′, respectively, in a summing circuit effect. The resistors 32′ and 34′ are connected in common to the junction of the voltage variable capacitor 37′ and crystal 33′ with the Varactor diode 37′ connected cathode to crystal 33′ and anode to resistor 38 and capacitor 49. With this approach the Varactor diode 36 or its equivalent is eliminated completely.

In the modification of FIG. 6, the coarse and fine temperature compensation circuit correction voltages are applied through resistors 32″ and 34″, respectively, to opposite sides of the voltage variable capacitor 37″ in a circuit modification that otherwise is very similar to the embodiment modification of FIG. 5.

Whereas this invention is here illustrated and described with respect to several specific embodiments hereof, it should be realized that various changes may be made without departing from the essential contributions to the art made by the teachings hereof.

I claim:

1. A temperature compensated crystal oscillator comprising:

(a) a crystal oscillator circuit including a fine tune voltage input terminal;
(b) means for sensing temperature;
(c) means for generating a variable frequency electrical signal in response to the sensed temperature;
(d) means for counting the frequency of said electrical signal and producing a digital count output;
(e) programmed memory means for receiving said digital count output and in response thereto producing a frequency correction digital output;
(f) means for receiving and converting said frequency correction digital output to an analog voltage; and
(g) means for applying said analog voltage to said fine tune voltage input terminal.

2. A temperature compensated crystal oscillator as defined by claim 1 wherein said means for sensing temperature is a thermistor and said means for generating an electrical signal comprises a thermistor controlled oscillator circuit including said thermistor.

3. A temperature compensated crystal oscillator as defined by claim 2 wherein said means for counting includes gate means for receiving said electrical signal and a frequency counter.

4. A temperature compensated crystal oscillator as defined by claim 3 wherein said programmed memory means comprises a ROM and said means for converting includes a latch circuit for receiving said frequency correction digital output.

5. A temperature compensated crystal oscillator as defined by claim 4 and including a timing control circuit for gating said gate means, resetting said frequency counter, and enabling said latch circuit to receive said frequency correction digital output.

6. A temperature compensated crystal oscillator as defined by claim 5 wherein said crystal oscillator circuit includes a coarse tuned voltage input terminal, and further including a coarse temperature compensation circuit for generating a second electrical signal in response to sensed temperature and means for applying said second electrical signal to said coarse tune voltage input terminal.

7. A temperature compensated crystal oscillator as defined by claim 6 wherein said crystal oscillator circuit includes a crystal having first and second terminals, a first varactor diode and a first resistor serially connecting said first terminal to a regulated DC voltage, a second varactor diode and a second resistor serially connecting said second terminal to a second DC voltage level, said first terminal providing said fine tune voltage input terminal, and said second terminal providing said coarse tune voltage input terminal.

8. A temperature compensated crystal oscillator as defined by claim 7 wherein said coarse temperature compensation circuit comprises a second thermistor controlled oscillator.

9. A temperature compensated crystal oscillator as defined by claim 1 wherein said crystal oscillator circuit includes a coarse tune voltage input terminal, and further including a coarse temperature compensation circuit for generating a second electrical signal in response to sensed temperature and means for applying said second electrical signal to said coarse tune voltage input terminal.

10. A temperature compensated crystal oscillator as defined by claim 9 wherein said crystal oscillator circuit includes a crystal having first and second terminals, a first varactor diode and a first resistor serially connecting said first terminal to a regulated DC voltage, a second varactor diode and a second resistor serially connecting said second terminal to a second DC voltage level, said first terminal providing said fine tune voltage input terminal, and said second terminal providing said coarse tune voltage input terminal.

11. A temperature compensated crystal oscillator as defined by claim 10 wherein said coarse temperature compensation circuit comprises a second thermistor controlled oscillator.

References Cited

UNITED STATES PATENTS 3,397,367 8/1968 Steel et al. __________ 331—158

JOHN KOMINSKI, Primary Examiner

U.S. Cl. X.R.

307—310; 328—3; 331—176